United States Patent
Bhargava et al.

(10) Patent No.: US 8,443,224 B2
(45) Date of Patent: May 14, 2013

(54) APPARATUS AND METHOD FOR DECOUPLING ASYNCHRONOUS CLOCK DOMAINS

(75) Inventors: Prashant Bhargava, Gurgaon (IN); Mohit Arora, Faridabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 444 days.

(21) Appl. No.: 12/912,780

(22) Filed: Oct. 27, 2010

(65) Prior Publication Data
US 2012/0110364 A1    May 3, 2012

(51) Int. Cl.
*G06F 1/12* (2006.01)
*G06F 1/04* (2006.01)
*G06F 5/06* (2006.01)

(52) U.S. Cl.
USPC .......................... 713/400; 713/375; 713/600

(58) Field of Classification Search ............. 713/400
See application file for complete search history.

(56) References Cited

U.S. PATENT DOCUMENTS

| | | | | |
|---|---|---|---|---|
| 5,533,123 | A * | 7/1996 | Force et al. | 713/189 |
| 6,757,352 | B1 * | 6/2004 | Kao | 377/49 |
| 6,900,665 | B2 | 5/2005 | Ma | |
| 7,017,066 | B2 * | 3/2006 | Retter et al. | 713/400 |
| 7,500,132 | B1 * | 3/2009 | Pothireddy et al. | 713/600 |
| 8,205,110 | B2 * | 6/2012 | Petrick | 713/375 |
| 2002/0110210 | A1 | 8/2002 | May | |
| 2009/0195280 | A1 * | 8/2009 | Schlegel et al. | 327/162 |
| 2009/0238317 | A1 | 9/2009 | McCabe | |

FOREIGN PATENT DOCUMENTS

JP    2002277572 A  *  9/2002

OTHER PUBLICATIONS

Kessels et al., Clock Synchronization Through Handshake Signalling, Proceedings of the Eighth International Symposium on Asynchronous Circuits and Systems, (ASYNC '02), IEEE Computer Society, 2002.

* cited by examiner

*Primary Examiner* — Suresh Suryawanshi
(74) *Attorney, Agent, or Firm* — Charles Bergere

(57) ABSTRACT

A circuit and method for synchronizing signals between asynchronous clock domains within digital electronic circuits decouples asynchronous clocks. The timing of the slower clock is used to prevent read and write to counters so that write signals from the fast clock domain can be directly used in the slower clock domain when the counters are not toggling. This feature removes the need for sampling and holding the data on the fast clock, which would require consume additional power and require additional circuit area.

20 Claims, 6 Drawing Sheets

APPARATUS AND METHOD FOR DECOUPLING ASYNCHRONOUS CLOCK DOMAINS

BACKGROUND OF THE INVENTION

The present invention relates generally to an apparatus and method for synchronizing signals between asynchronous clock domains within digital electronic circuits, and more particularly, to decoupling asynchronous clocks within different clock domains in ultra low power real time clock (RTC) applications within battery operated system on chip (SoC) applications.

SoC devices include components and devices that contain different memories and modules that have different cycle times. Different methods have been adopted for data and clock synchronization within such systems. However, these methods and systems tend to be power and space inefficient. In particular with SoC devices having battery back-up assisted RTC applications, the amount of power consumed is a concern and should be reduced or minimized. Of all the peripherals and components of the SoC, RTC devices are kept operational with a battery supply even when the main power is turned off. The RTC devices are kept operational to maintain vital functions such time keeping. RTC devices also may perform other operations when the main power is turned off, such as critical data storage, device tamper detection and clock compensation. It is necessary for these functions to remain operational when the main power to the SoC is removed. For example, in some applications, such as in utility metering and medical applications, the RTC implementations are required to work for 15-20 years on a single battery. RTC devices are thus designed to consume the least amount of power possible.

RTC implementations use at least two clocks with different clock speeds in different clock domains. The two clocks typically form a fast clock domain for the register programming interface and a slow clock domain for maintaining time and date functionality. The two clocks are typically completely asynchronous to each other; however, signals are required to be transmitted between these clock domains, and thus these systems are prone to meta-stability states and missed signals from the fast to the slow clock domains.

In conventional clock and data synchronization systems, handshake circuits and synchronizers, respectively, are used. Typically, two to three flip-flops are used in conventional synchronizer design. This requires the data on the fast clock domain, i.e. the load value and the enable signal, to be kept constant or stable until the slower clock domain samples the data. Each flip-flop consumes power when kept in the constant or stable state. Accordingly, as the number of flip-flops increases when larger and multiple bit values are to be transferred, the area and power consumption also is increased. Additionally, these synchronizers require the clock to be available all the time, which further increases power consumption even when no registers are being accessed. A typical synchronization circuit used in conventional RTC devices is shown in FIGS. 1 and 2.

Therefore, it is desirable to have more efficient methods and systems to reduce power consumption of asynchronous clocks in systems with different clock domains.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which.

DETAILED DESCRIPTION OF THE INVENTION

Figure 1:
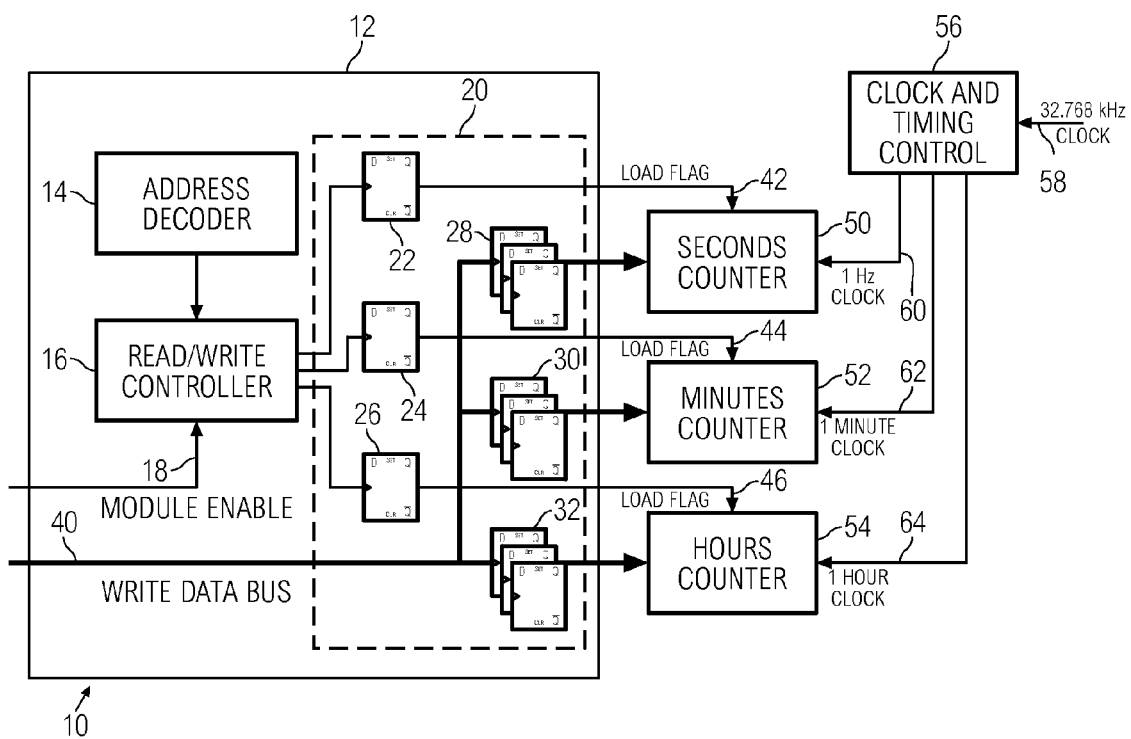
FIG. 1 is a conventional circuit diagram for synchronizing a signal from fast to slow clock domains.

In one embodiment, the present invention is a circuit for transmitting a signal between different clock domains. The circuit includes a first clock domain having a first clock with a first clock cycle, the first clock domain arranged to transmit an enable signal and a load signal; a second clock domain having a second clock with a second clock cycle different from the first clock cycle of the first clock, the second clock domain arranged to receive the enable signal and the load signal from the first clock domain; a counter and a clock and timing controller in the second clock domain and operating at the second clock cycle, the clock and timing controller for asserting an adjusted clock derived from the second clock to increment the counter, and the counter for loading a value upon receiving the load signal and a resulting clock combined from the enable signal and the adjusted clock from the clock and timing controller.

In one embodiment the circuit further includes a processor located in the first clock domain, wherein the clock and timing controller of the second clock domain generates an invalidate signal to cause the processor to prevent subsequent enable and load signals to be transmitted from the first clock domain until the counter has been incremented. The invalidate signal may be asserted when the adjusted clock is generated, and may be asserted for two clock cycles of the second clock. The clock and timing controller may, upon incrementing the counter, de-assert the invalidate signal, thereby allowing the processor to send the enable and load signals to the second clock domain.

In one embodiment the circuit may further include an OR gate that receives the enable signal from the first clock domain and the adjusted clock generated from the clock and timing controller for providing the resulting clock to the counter. The first clock cycle of the first clock domain may be faster than the second clock cycle of the second clock domain. The load signal differentiates between loading a value and incrementing the value in the counter. The circuit may include an additional synchronizer to provide a synchronized clock and synchronize the invalidate signal transmitted to the first clock domain from the second clock domain for providing a synchronized invalidate signal.

In one embodiment the circuit is a real time clock circuitry domain and the synchronizer is located external to the real time clock circuitry. The circuit may form part of a system on chip (SoC). There may be at least two counters in the second clock domain, and the clock and timing controller generates different adjusted clocks for each counter. The adjusted clocks of the at least two counters may be any of a 1 Hz seconds clock, minutes clock, hours clock, days clock, months clock, years clock, or the like. The clock of the second clock domain may be an oscillator clock. The clock of the second clock domain may be a 32.768 kHz clock. The circuit may further comprise a processor disposed in the first clock domain, wherein the clock of the first clock domain is a gated bus clock that toggles upon the processor sending an enable signal and a load signal to the second clock domain.

Another aspect of the invention is a method for transmitting a signal between different clock domains. The method includes transmitting an enable signal and a load signal from a first clock domain having a first clock with a first clock cycle; receiving the enable signal and the load signal at a second clock domain having a second clock with a second clock cycle different from the first clock cycle of the first clock, the second clock domain has a counter and a clock and timing controller operating at the second clock cycle; asserting an adjusted clock derived from the second clock from the clock and timing controller to increment the counter, and loading a value in the counter upon receiving the load signal and a resulting clock combined from the enable signal and the adjusted clock from the clock and timing controller.

In another embodiment, the method further includes generating an invalidate signal from the clock and timing controller of the second clock domain that prevents subsequent enable and load signals to be transmitted from the first clock domain until the counter has been incremented. The invalidate signal may be asserted when the adjusted clock is generated. The invalidate signal may be asserted for two clock cycles of the second clock of the second clock domain, and de-asserted upon incrementing the counter for allowing another enable signal and load signal to be transmitted from the first clock domain to the second clock domain. The method may further comprise combining the adjusted clock and the enable signal with an OR gate for providing the resulting clock to the counter.

Embodiments of the invention implement an apparatus and method for decoupling asynchronous clock domains in digital electronic circuits such as SoC having different clock domains. An embodiment of the invention decouples asynchronous clock domains with a configuration without relying on synchronizers and utilizes the clocking behavior of the counters. Such a configuration reduces power consumption and area of the SoC. To illustrate the advantages of embodiments of invention reference and comparison is made to more conventional systems that use synchronizers, as shown in FIGS. 1 and 2.

RTC implementations use at least two clocks that operate at different clock speeds in different clock domains. The two clocks form a fast clock domain and a slow clock domain. A conventional system 10 is shown in FIGS. 1 and 2 that relies on synchronizers to perform transferring of signals from a fast clock domain 12 and a slow clock domain. One clock is typically used to interface to the central processing unit (CPU). This is typically the faster clock domain 12 of the system and is often referred to as the CPU bus clock domain or bus clock domain. Through this bus clock interface all registers are read and written to by the CPU via components such as address decoder 14, write data bus 40, read/write controller 16, and module enable signal 18. The second clock is typically the slower clock of the two and a 32.768 kHz clock is commonly used to run the time and date keeping functions. The two clocks are completely asynchronous to each other.

The two clock domains interface with each other via synchronizers, shown as synchronization block 20. These synchronizers are normally 2-3 flops 22, 24, 26, 28, 30, 32 running on the bus clock. The write data bus 40 is connected to the respective flip-flops 28, 30, 32 and load signals or load flags 42, 44, 46 are transmitted to the second slower clock domain to seconds, minutes and hours counters 50, 52, 54. The second clock is always kept running and this clock is divided down by a prescaler to generate a 1 Hz, 1 minute, 1 hour, etc., clock that clocks the seconds, minutes, hours, etc counters 50, 52, 54 via clock and timing controller 56. The 32.768 kHz clock 58 may also clock other logic such as anti-tamper logic and compensation logic inside the RTC. The clock and timing controller 56 receives the 32.768 kHz clock 58 and provides the 1 Hz clock 60 to the seconds counter 50, the 1 minute clock 62 to the minutes counter 52, and the 1 hour clock 64 to the hours counter 54, respectively.

Figure 2:
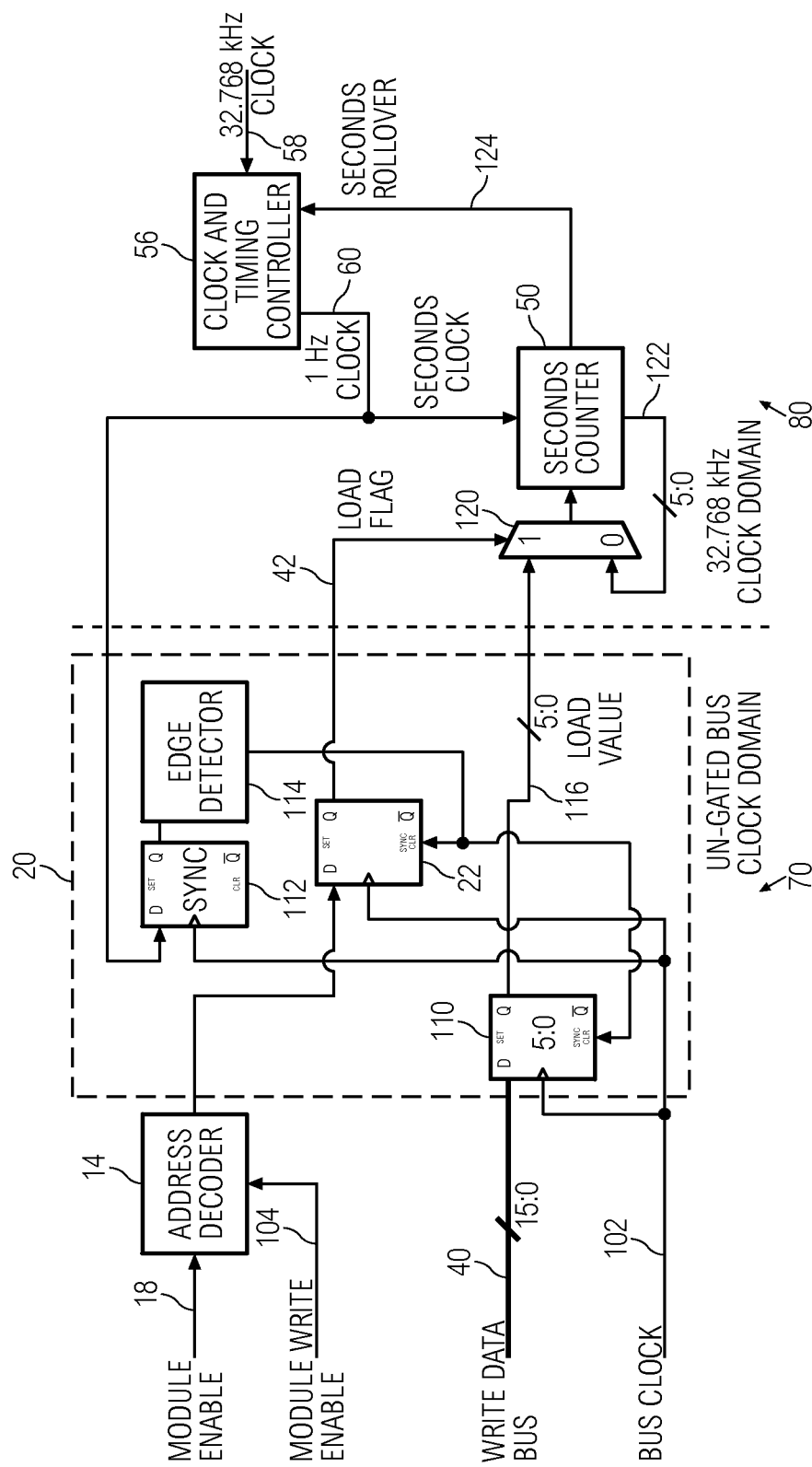
FIG. 2 is a conventional circuit diagram of synchronization and latching logic for a counter of FIG. 1 having an un-gated bus clock domain and a slow clock domain shown in greater detail.

An example of synchronization and latching logic for a counter, such as the seconds counter, in such a system is shown in more detail in FIG. 2. FIG. 2 shows the bus clock domain 70 and the 32.768 kHz clock domain 80 in greater detail to illustrate the reliance of the synchronizers in such an implementation with respect to the seconds counter 50. FIG. 2 uses the same reference numerals for corresponding features shown in FIG. 1. FIG. 2 also shows the bus clock 102 for the bus clock domain 70 and the module write enable 104 for the address decoder 14. The synchronizer shown in FIG. 1 for the seconds counter comprises flip-flop 22 and series of flip-flops 28. Flip-flop 22 is shown in FIG. 2 and the series of flip-flops 28 shown in FIG. 1 is shown in greater detail with flip-flops, 5:0 flip-flop 110 and sync flip-flop 112, together with edge detector 114 in the bus clock domain 70. A 5:0 load value from the Q terminal of the 5:0 flip-flop 110 transmits a 5:0 load value 116 to the slow clock domain.

In the slower 32.768 kHz clock domain, multiplexer 120 receives the load flag signal 42, the load value 116, and a 5:0 signal 122 from the seconds counter 50. A seconds rollover 124 from the seconds counter 50 generates the clock for the minutes counter (not shown in FIG. 2). The seconds counter 50 runs off of the 1 Hz clock 60 that is generated by dividing down the second clock 58 via the clock and timing controller 56. If the load enable is asserted, the (load value+1) is stored in the seconds counter, otherwise the counter value is incremented normally. The above logic is replicated for each counter, such as the seconds counter 50 as discussed, minutes counter 52, hours counter 54, and the like, in the RTC shown in FIG. 1.

In such an implementation of FIG. 2, the bus clock is gated to toggle in such a way that a clock edge is allowed to pass to the RTC when the CPU is accessing the block. This is an attempt to save some power but the synchronizers between the bus clock and 32.768 kHz clock always run on the un-gated version of the bus clock. As the bus clock is typically much faster than the 32.768 kHz clock, the fast to slow clock domain synchronizers are conventionally used as shown in FIGS. 1 and 2, and the data is latched from the bus clock domain until it is sampled in the slower clock (i.e. 32.768 kHz clock) domain, and subsequently clear when data has been sampled. All the synchronization and latching logic runs on the un-gated bus clock and thus consumes substantial power as power is directly proportional to the toggle activity of signals (i.e. the number of signals changing state at any instant in time) inside a chip.

Such systems of FIGS. 1 and 2 may due to their operational nature never go into low power mode, and hence it is desired that the power consumption must be minimized. Such situations arise when RTC systems that are battery powered when the main power to the SoC is removed in applications such as for example metering applications, or applications in which continuous real time processing is required (i.e. CPU is active at all times and cannot go into a low power mode) and where the whole SoC is powered by battery. In such systems as discussed with respect to FIGS. 1 and 2, a toggling clock is always required to support such synchronization logic, and therefore is inefficient as the toggling clock and devices of the synchronization logic continues consuming power. The synchronization block 20 of FIGS. 1 and 2 runs on un-gated bus clock and load flags are cleared on acknowledgement from the counters which leads to the coupling between the two domains.

Figure 3:
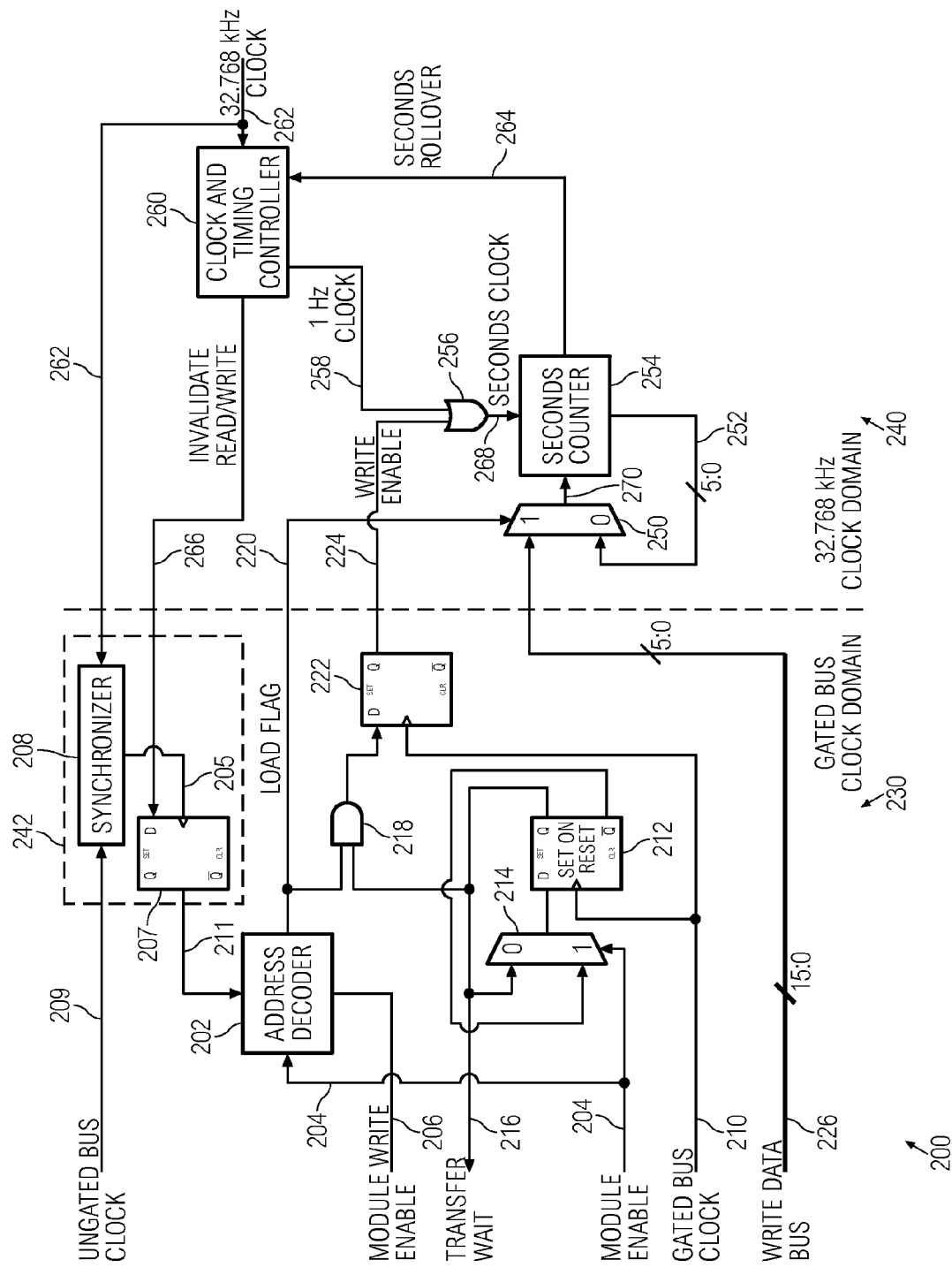
FIG. 3 is a circuit diagram of a fast clock domain, for example gated bus clock domain, and a slow clock domain, for example 32.768 kHz clock domain, in accordance with an embodiment of the invention.

Referring now to FIG. 3, a circuit diagram 200 of a fast clock domain, for example gated bus clock domain 230, and a slow clock domain, for example 32.768 kHz clock domain 240, in accordance with an embodiment of the invention is shown. The fast clock domain is a gated clock domain employing clock gating logic techniques at SoC level to decouple portions of the fast clock domain and cut power consumption. The faster clock domain signals and gated clock are asserted only upon register access when the register are being written or read. It will be appreciated that the clock domains may have different cycles and clock speeds than described here. The embodiment shown in FIG. 3 does not use synchronizers like that of FIGS. 1 and 2, instead the system utilizes the clocking behavior of the counters. It will be appreciated that the synchronizer 208 is a standard synchronizer placed outside of the RTC logic that performs routine synchronization at the SoC level.

FIG. 3 shows the circuit diagram 200 with an address decoder 202 receiving a module enable signal 204, module write enable signal 206 from the CPU (not shown), and a signal 211 from the flip flop 207 which is the synchronized invalidate signal 211. The synchronizer 208 receives the un-gated bus clock 209 and 32.768 kHz clock 262 to provide a synchronized clock 205 to flip flop 207. A set on reset flip-flop 212 receives the gated bus clock 210 and the output from multiplexer (mux) 214 is received at D terminal. The multiplexer receives the module enable 204 and signals from the Q and $\overline{Q}$ terminals of the set on reset flip flop 212. The multiplexer and the set on reset flip flop 212 combine the signals in such a way that transfer wait is asserted for one clock cycle of the gated bus clock from terminal Q of the set on reset flip flop. An AND gate 218 receives the signal from terminal Q of the set on reset flip flop and the load signal or load flag 220 from the address decoder 202. A flip flop 222 receives the output of the AND gate 218 and also receives the gated bus clock 210, and provides a write enable signal 224 which is a pulse of one gated bus clock cycle. The CPU also provides a write data bus 226, for example 15:0 and 5:0 as shown, from the gated bus clock domain 230 to the slower kHz clock domain 240. It will be appreciated that the CPU interface for example is typically fixed with 8, 16 or 32-bits, and only the necessary bits are used to program the registers. For example, the seconds counter counts from 0 to 59 seconds for which 6-bits are needed and hence 6-bits from the write data bus are used to store the seconds counter value, and for example 5-bits are similarly needed for the hour counter to count 24 hours (0 to 23).

Figure 5:
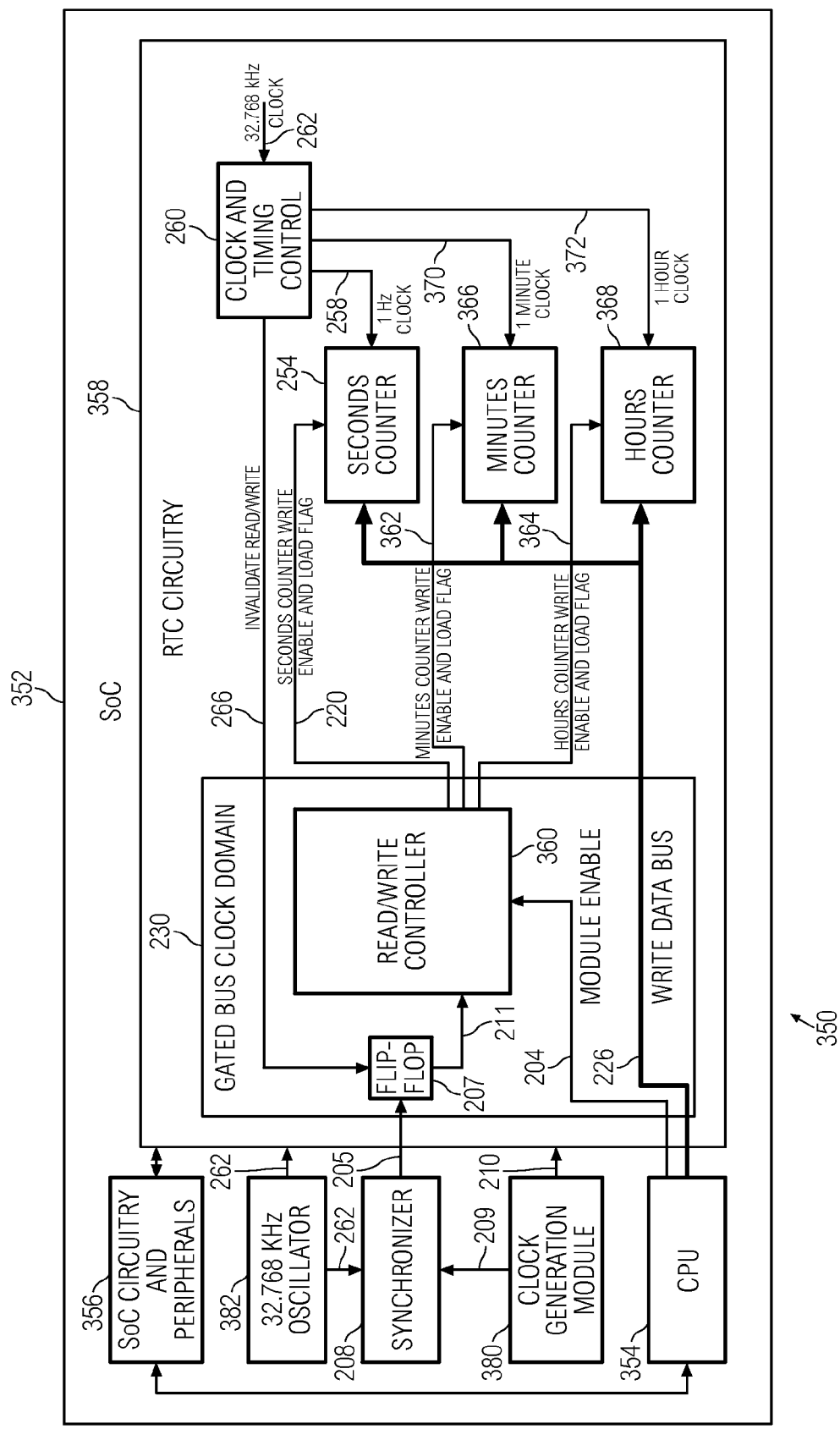
FIG. 5 is a circuit diagram of a system having the circuit of FIG. 3 implemented on a SoC in accordance with an embodiment of the invention.

In the slower 32.768 kHz clock domain 240 a multiplexer (mux) 250 receives the load flag 220, the 5:0 bits of the write data bus signal 226, for example 5:0 as shown and the counter signal 252, from the seconds counter 254. The seconds counter 254 receives a resulting clock 268 from the output of an OR logic gate 256. The OR gate 256 receives the write enable signal 224 and an adjusted clock 258, for example 1 Hz clock signal 258, from a clock and timing controller 260. The seconds counter 254 increments on the 1 Hz clock 258. The seconds counter 254 receives the load value signal 270 from the multiplexer 250. The clock and timing controller receives the 32.768 kHz clock 262 and the seconds rollover 264 from the seconds counter 254. The clock and timing controller 260 provides an invalidate read/write signal 266 to the flip flop 207 running off the clock 205 generated by synchronizer 208 in the faster gated bus clock domain 230 but the synchronizer 208 is placed outside the RTC logic. The synchronizer 208 is placed outside the RTC circuitry in the SoC logic to save battery power, as shown in FIG. 5. The seconds clock 268 is the output of the OR gate which is received by seconds counter 254.

The circuit diagram of FIG. 3 shows the circuit implemented for the seconds counter, however, it is understood a similar circuit may be implemented for each counter required, such as minutes counter, hours counter, days counter, day-of-week counter, months counter, years counter, and the like, to enable them to get loaded with new value or increment on their respective clocks.

In FIG. 3, the adjusted clock, for example 1 Hz clock 258, is generated from the 32.768 kHz clock 262 using a divider counter (not shown) that counts from 0 to 32767 and is present inside the clock and timing controller 260. Rollover (not shown) of this divider counter generates the 1 Hz clock 258. The seconds counter 254 increments on this 1 Hz clock. This clock does not have a duty cycle of 50% but the clock is in the form of a one 32.768 kHz clock period high and 32766 clocks low period. The same behavior in clock is there for all other counters, such as minutes counters, hours counters and the like. Thus, if it is possible to prevent updates, such as write and/or read, during one state, for example when the time the clock is high, and allow updates to the counter when the clock is in another state, for example when the clock is low, then, OR with OR logic gate 256 the write enable 224 for counter 254 with the 1 Hz generated clock 258 to get the resulting clock or final counter clock 268. This final clock samples the load flag to decide whether to load the load value 270 into the counter or increment the counter. In this embodiment, this requires the load flag 220 to be asserted for two bus clock cycles to be sampled correctly by the final counter clock 268. A CPU invalidate read/write signal 266 is asserted in the 32.768 kHz clock domain for two 32.768 kHz clock periods to prevent generation of read and write enables 206 and load flags 220 in the fast clock domain when the adjusted clock, for example 1 Hz clock 258, is asserted and corresponding counter, for example seconds counter 254, is incrementing. This signal 266 is synchronized to provide a synchronized invalidate signal 211 using a special synchronization scheme, shown as a dotted box 242, in FIG. 3. This special synchronization scheme comprises of a flip-flop 207 running off a synchronized clock 205 that is synchronous with its edges aligned to both the bus clock 209 and 32.768 kHz clock 262. This clock 205 is generated using synchronizer 208 which is also a part of the special synchronization scheme. It will be appreciated that the 32.768 kHz clock is synchronized using a normal 2-stage synchronizer running on the un-gated bus clock, and the output of synchronizer 208 is a clock 205 that has edges aligned to both 32.768 kHz and bus clocks. To save power, in an embodiment, the synchronizer 208 is placed outside the RTC circuitry in the SoC logic, which may run on main SoC power and not on battery power. As mentioned above, synchronizer 208 lies outside of the RTC design is part of the integration logic at the SoC level, as shown for example in FIG. 5.

In an embodiment, the gated bus clock 210 toggles when there is a write or read access to the RTC module. Normally, in previous designs, the read or write access is 1 clock wide and the address decoding, read or write enable generation to registers is done using combinational logic (i.e. using logic gates). In order to be able to OR the write enable 224 and 1 Hz clock 258, the write enable generation has to be sequential (i.e. output of a flop), to avoid wrong operation due to glitches. Glitches can be seen if generation is done using combinational logic. Thus, to generate the write enable 224 sequentially and also clear it (to enable the next write access), two clock edges of gated bus clock 210 are required to perform the action. The write enable 224 is asserted on the gated bus clock 210 edge and in order to clear it, a second bus clock 210 edge is taken from the system by asserting a wait response signal 216 on the CPU interface. The transfer wait signal 216 inserts a one bus clock 209 wait cycle in the system and the write or read access is held until another bus clock cycle where the wait signal is de-asserted. In this way, two clock edges of the gated bus clock 210 are obtained to assert the write enable 224 and also de-assert the write enable. The load flag 220 is a generated combinational by address decoder 202 using the module enable signal 204, module write enable signal 206 and address bus signal to the RTC module. Since the address, modules enables and data are kept stable during a wait state, the load flag does not glitch.

In the 32.768 kHz clock domain, the write enable 224 and 1 Hz clock 258, for seconds counter, are OR-ed by OR gate 256 to form the resulting clock or for example a final seconds clock 268 that runs the seconds counter 254. If the load signal or flag 220 is asserted, the load value (5:0, 5 down to 0, of the write data bus 226) is stored in the counter 254 else the counter value is incremented normally. Seconds rollover 264 is asserted to generate the 1 minute clock by the clock and timing control block 260 for the minutes counter (not shown).

Figure 4:
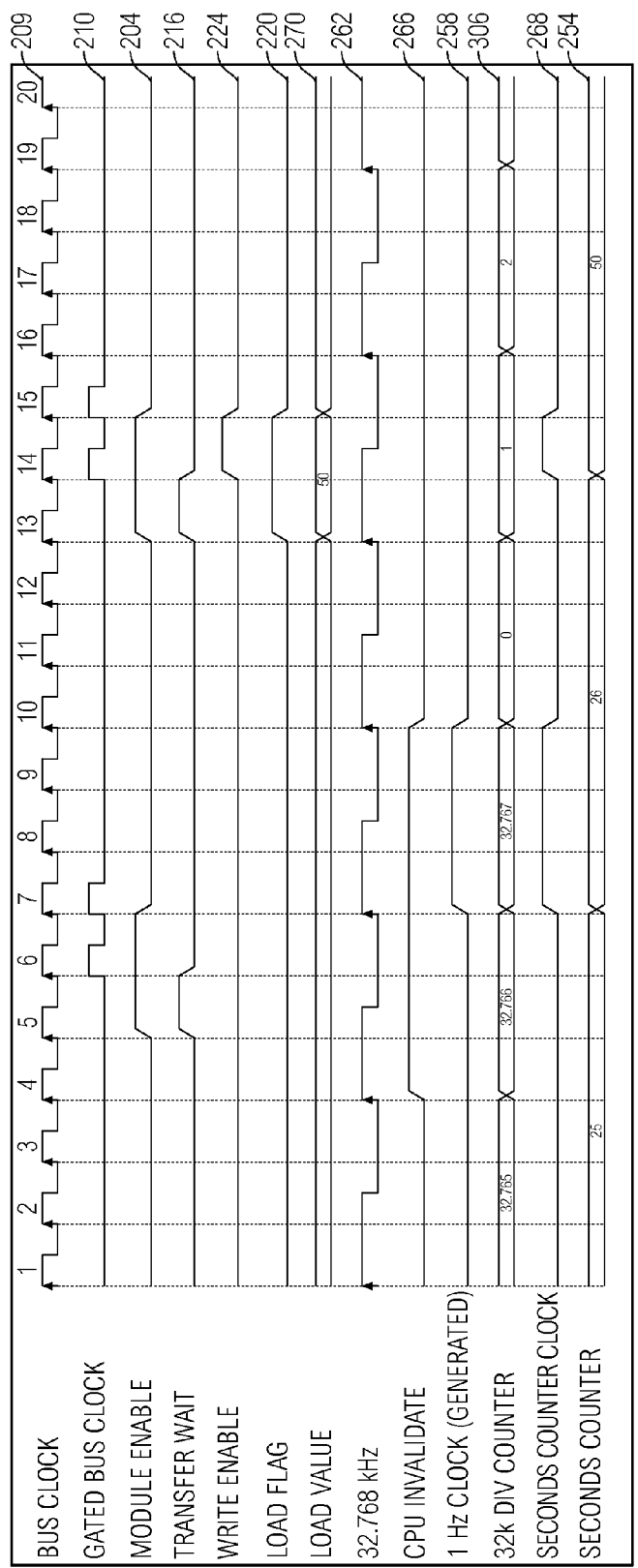
FIG. 4 is a timing diagram showing the behavior of the transfer of a signal from a fast clock domain to a slow clock domain in the circuit of FIG. 3 in accordance with an embodiment of the invention.

FIG. 4 is a timing diagram 300 showing the simulation behavior of the transfer of a signal from a fast clock domain to a slow clock domain in the circuit of FIG. 3 in accordance with an embodiment of the invention. The timing diagram shows 20 bus clock 209 cycles with leading clock edges indicated (1-20), and 32.768 kHz clock 262 with leading edge indicated. Other signals shown include gated bus clock 210, module enable signal 204, transfer wait signal 216, write enable signal 224, load flag signal 220, load value signal 270, CPU invalidate signal 266, 1 Hz clock generated signal 258, divider counter signal 306, seconds counter clock signal 268, and seconds counter signal 254. In this embodiment, the bus clock is at the SoC level and it will be appreciated that the SoC does the gating per peripheral and the gated bus clock is given to that peripheral. The peripheral of course does not see or receive the un-gated clock.

Turning to FIG. 5, a system 350 in accordance with an embodiment of the invention implemented on a SoC 352. The SoC 352 comprises a CPU 354, SoC circuitry and devices/peripherals 356 and RTC circuitry 358 is shown. The RTC circuitry generally shows the main features of the circuit diagram of FIG. 3. In addition, a read/write controller 360 is shown that provides seconds, minutes, and hours counter write enable and load flag signals 220,362,364 to seconds counter seconds, minutes and hours counter 254,366,368 respectively. The read/write controller 360 of FIG. 5 is shown in greater detail in FIG. 3 and comprises AND gate 218, flip-flop 222, mux 214, set on reset flip-flop 212. The clock timing and control block 260 generates clocks (1 Hz clock 258, 1 minute clock 370, and 1 hour clock 372) for each counter 254,366,368, which are derived from the 32.768 kHz clock 262. It can be seen that the load enable signals 220,362, 364 are not asserted when the invalidate read/write signal 266 is asserted. As shown in FIG. 3, the write enable is OR-ed with OR logic gate 256 with the clock from the clock and timing control block 260 to form the final clock counter. A clock generation module 380 generates gated bus clock 210 and provides the un-gated bus clock 209 to the synchronizer 208. The oscillator 382 generates the clock of the second clock domain, for example, the 32.768 kHz clock 262, which forms the input to synchronizer 208.

Figure 6:
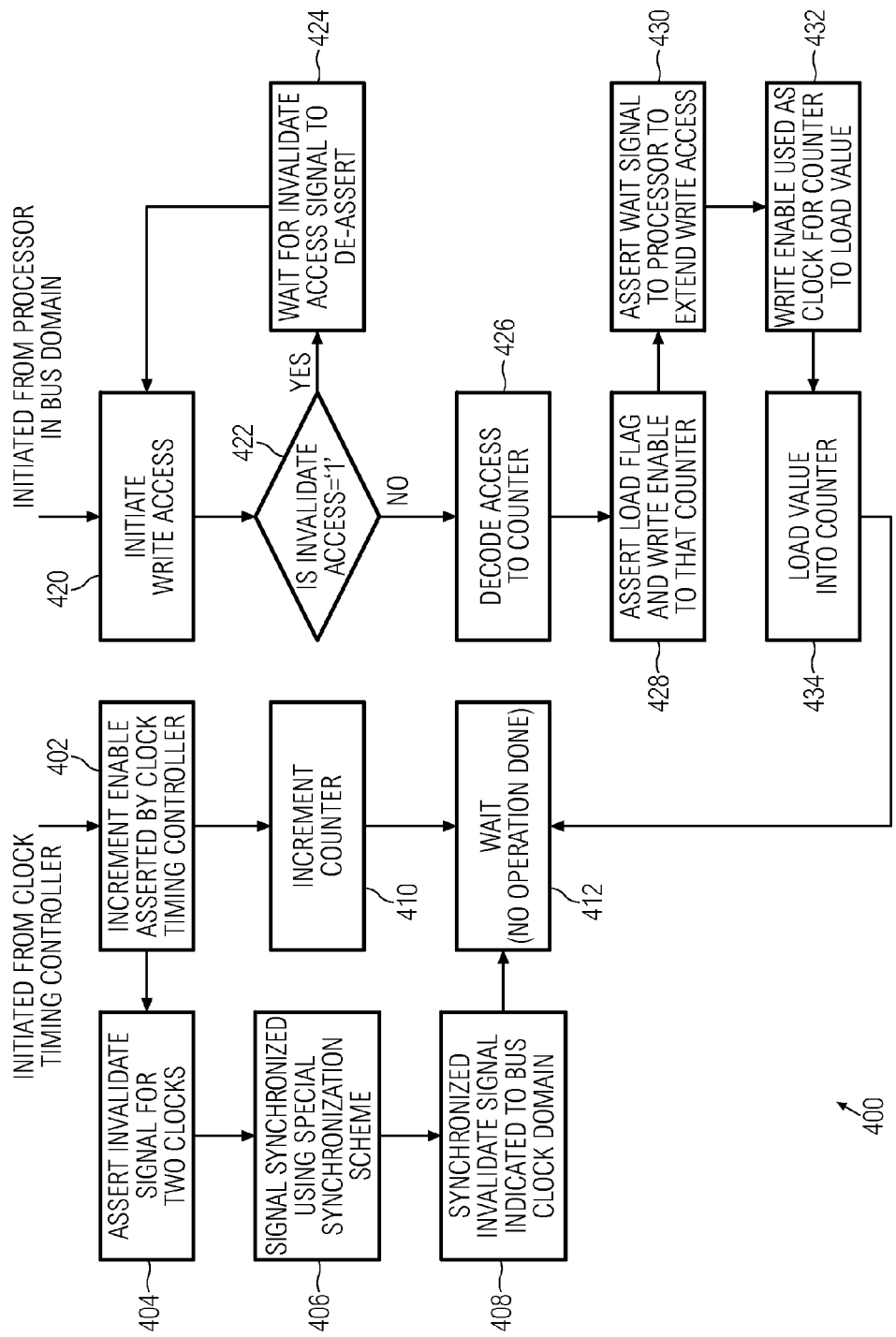
FIG. 6 is a flow chart of a method in accordance with an embodiment of the invention.

FIG. 6 is a flow chart 400 of a method in accordance with an embodiment of the invention. Reference is made to FIGS. 3, 4 and 5 in discussing the simulation behavior of the circuit. The increment enable may be a clock to counter as write enable. The increment enable signal 258 asserted by clock timing controller 402 is initiated from clock timing controller 260. The initiate write access 420 is initiated from processor 354 in bus domain as module write enable 206.

At clock edge number 4, the CPU invalidate read/write signal 266 is asserted 422 which will block all read and write signals to the RTC counters for two 32.768 kHz clock 262 cycles.

At clock edge number 5, a write access module enable signal 204 is initiated 420 by the CPU to program the RTC counters. Since the CPU invalidate signal 266, after synchronization 406, signal 211 is asserted 408, the flip flop 207 will not let the write enable signal 224 and the load flag signal 220 to assert. Thus, the counter value remains unchanged 422.

At clock edge number 5, transfer wait signal 216 is also asserted to introduce a wait state 430 in the CPU access and the write cycle is replicated on clock edge number 6.

At clock edge number 7, an edge on the 1 Hz clock 258 makes 402 the counter increment 410 normally from previous count of 25 to new count of 26. On completing the increment, the RTC waits 412 for another write access or increment to it. While waiting no other operation on the RTC counters is done.

At clock edge number 10, the CPU invalidate signal 266 is de-asserted 424. This signal was asserted 404,406,408 for two 32.768 kHz clock cycles.

At clock edge number 13, another CPU write access module enable signal 204 is initiated 420 to write a value into the RTC counters. Since the CPU invalidate signal 266 and the synchronized invalidate signal are not asserted, the write access will follow through 422.

At clock edge number 13, transfer wait signal 216 is also asserted to introduce a wait state 430 in the CPU access and the write enable signal 206 cycle is replicated on clock edge number 14 thereby extending the write access 430.

At clock edge number 13, the load flag 220 is asserted via combinational decoding 426 of address, module enable signal 204, and module read write enable signal 206.

At clock edge number 14, write enable signal 224 is asserted 428 to the RTC seconds counter 254 on which write access is made and de-asserts on clock edge number 15, the second clock edge as wait state was introduced.

At clock edge number 14, due to OR-ing of counter write enable 432 and 1 Hz clock 258, a clock edge on the seconds counter clock 268 is shown. Since the load flag 220 is asserted, the seconds counter will load the load value 434 of 50 into itself 254. On completing the write access, the RTC waits 412 for another write access or increment to it. While waiting no other operation on the RTC counters is done.

The embodiments of the invention utilize the timing relation between the two clock domains so that the signals can be merged without requiring any additional clock domain crossing circuitry or additional flip flops to hold data until it is sampled in the slower domain. Previous attempts, such as discussed with respect to FIGS. 1 and 2 implement additional flip flops and control logic for clock domain crossing that is not required in the embodiment of the invention. Previous attempts, such as discussed with respect to FIGS. 1 and 2 do not work when the fast domain clock is a gated clock and toggles only when the fast domain access signal changes value and the un-gated clock is not available for the synchronizers.

Embodiments of the invention utilize the RTC counters to toggle at a fixed interval such that a control signal is generated to invalidate read and write logic during that instant. The increment clocks to increment the time and date counters in the slower clock domain are derived from an oscillator clock in such a way that a rollover of the seconds counter toggles the minutes counter, and so on. The rollover is asserted for one oscillator clock, which allows any valid write access, i.e. when invalidate signal is de-asserted, to be OR-ed with the counter increment clock and give the final counter clock. With this configuration, counters get loaded immediately when there is no increment to the counters. The load value is directly loaded without any sample and hold logic. Additionally, this configuration supports read/write on the gated bus clock. Embodiments of the invention utilize the inherent counter characteristics and qualities to allow read/write when the counters are not changing, without requiring synchronization logic running in the faster clock domain.

Embodiments of the invention utilize the timing of the slower counter clock to prevent read and write to the counters so that write signals from the fast clock domain can be directly used in slower clock domain when the counters are not toggling. This feature of embodiments of the invention remove the need for sampling and holding the data on the fast clock which requires additional power consumption and area of the SoC. Accordingly, by implementing embodiments of the invention on a SoC, ultra low power SoC design employing clock gated logic may be achieved. This also results in maximizing battery life when the main power is removed from the SoC.

In applying the circuitry shown in FIGS. 3 and 5, the proposed implementation shows a reduction of approximately 30% in area and in the number of gates (9000 equivalent NAND gates compared to 6000 equivalent NAND gates) required when compared to previous attempts discussed with reference to FIGS. 1 and 2. Additionally, the proposed implementation shows a reduction of approximately 90% in power estimates with using a bus clock of 10 MHz (2.7 uA to 177 nA) when compared to previous attempts as discussed with reference to FIGS. 1 and 2. The power estimates are based upon the computer software netlist simulation scenario where the counters are loaded and allowed to run a period of time, for example for 2 seconds.

Embodiments of the invention may be realized in SoC and semiconductor devices as described above with fabrication and processing techniques well known in the industry. The circuits, systems and methods in accordance with embodiments disclosed above may be implemented for synchronizing signals between asynchronous clock domains within digital electronic circuits by decoupling asynchronous clocks. The timing of the slower clock is utilized to prevent read and write to the counters so that write signals from the fast clock domain can be directly used in slower clock domain when the counters are not toggling. This feature removes the need for sampling and holding the data on the fast clock which requires additional power consumption and area of the SoC.

Accordingly, by implementing embodiments of the invention on a system on chip SoC, ultra low power SoC design employing clock gated logic may be achieved to minimize power consumption.

While exemplary embodiments pertaining to the invention have been described and illustrated, it will be understood by those skilled in the technology concerned that many variations or modifications involving particular design, implementation or construction are possible and may be made without deviating from the inventive concepts described herein.

The invention claimed is:

1. A circuit for transmitting a signal between different clock domains, the circuit comprising:
 a first clock domain having a first clock with a first clock cycle, the first clock domain arranged to transmit an enable signal and a load signal;
 a second clock domain having a second clock with a second clock cycle different from the first clock cycle of the first clock, the second clock domain arranged to receive the enable signal and the load signal from the first clock domain; and
 a counter and a clock and timing controller disposed in the second clock domain and operating at the second clock cycle, the clock and timing controller for asserting an adjusted clock derived from the second clock to increment the counter, and the counter for loading a value upon receiving the load signal and a resulting clock combined from the enable signal and the adjusted clock from the clock and timing controller.

2. The circuit of claim 1, further comprising a processor located in the first clock domain, wherein the clock and timing controller generates an invalidate signal that causes the processor to prevent subsequent enable and load signals to be transmitted from the first clock domain until the counter has been incremented.

3. The circuit of claim 2, wherein the invalidate signal is asserted when the adjusted clock is generated.

4. The circuit of claim 3, wherein the invalidate signal is asserted for two clock cycles of the second clock of the second clock domain.

5. The circuit of claim 2, wherein the clock and timing controller, upon incrementing the counter, de-asserts the invalidate signal to the first clock domain thereby allowing the processor to transmit another enable signal and another load signal to the second clock domain.

6. The circuit of claim 2, further comprising a synchronizer to provide a synchronized clock to synchronize the invalidate signal transmitted to the first clock domain from the second clock domain.

7. The circuit of claim 6, wherein the circuit forms a real time clock circuit domain and the synchronizer is located external to the real time clock circuitry.

8. The circuit of claim 1, further comprising an OR gate that receives the enable signal from the first clock domain and the adjusted clock generated from the clock and timing controller and provides the resulting clock to the counter.

9. The circuit of claim 1, wherein the first clock cycle of the first clock domain is faster than the second clock cycle of the second clock domain.

10. The circuit of claim 1, wherein the circuit forms part of a system on chip (SoC).

11. The circuit of claim 1, wherein there are at least two counters in the second clock domain, and the clock and timing controller generates different adjusted clocks for each counter.

12. The circuit of claim 1, wherein the clock of the second clock domain is an oscillator.

13. The circuit of claim 1, wherein the clock of the second clock domain is a 32.768 kHz clock.

14. The circuit of claim 1, further comprising a processor disposed in the first clock domain, wherein the clock of the first clock domain is a gated bus clock that toggles upon the processor sending an enable signal and a load signal to the second clock domain.

15. A method of transmitting a signal between different clock domains, the method comprising:
   transmitting an enable signal and a load signal from a first clock domain having a first clock with a first clock cycle;
   receiving the enable signal and the load signal at a second clock domain having a second clock with a second clock cycle different from the first clock cycle of the first clock, the second clock domain having a counter and a clock and timing controller operating at the second clock cycle;
   asserting an adjusted clock derived from the second clock from the clock and timing controller to increment the counter; and
   loading a value in the counter upon receiving the load signal and a resulting clock combined from the enable signal and the adjusted clock from the clock and timing controller.

16. The method of transmitting a signal of claim 15, further comprising generating an invalidate signal from the clock and timing controller of the second clock domain preventing a subsequent enable signal and a subsequent load signal to be transmitted from the first clock domain until the counter has incremented.

17. The method of transmitting a signal of claim 16, wherein asserting the invalidate signal when the adjusted clock is generated.

18. The method of transmitting a signal of claim 17, wherein asserting the invalidate signal for two clock cycles of the second clock of the second clock domain.

19. The method of transmitting a signal of claim 17, further comprising de-asserting the invalidate signal to the first clock domain upon incrementing the counter allowing another enable signal to be transmitted from the first clock domain to the second clock domain.

20. The method of transmitting a signal of claim 16, further comprising combining the adjusted clock and the enable signal in accordance with OR logic for providing the resulting clock to the counter.

* * * * *